(12) United States Patent
Kuromizu

(10) Patent No.: US 8,939,632 B2
(45) Date of Patent: Jan. 27, 2015

(54) LIQUID CRYSTAL DISPLAY DEVICE, ILLUMINATING DEVICE, AND TELEVISION RECEIVING DEVICE

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 111 days.

(21) Appl. No.: 13/816,095

(22) PCT Filed: May 18, 2011

(86) PCT No.: PCT/JP2011/061381
§ 371 (c)(1),
(2), (4) Date: Feb. 8, 2013

(87) PCT Pub. No.: WO2012/023317
PCT Pub. Date: Feb. 23, 2012

(65) Prior Publication Data
US 2013/0128129 A1   May 23, 2013

(30) Foreign Application Priority Data

Aug. 20, 2010  (JP) .................................. 2010-185051

(51) Int. Cl.
*F21V 7/04*  (2006.01)
*F21V 23/00*  (2006.01)
(Continued)

(52) U.S. Cl.
CPC .............. *F21V 23/001* (2013.01); *G02B 6/009* (2013.01); *G09G 1/00* (2013.01); *G06F 1/133615* (2013.01); *G02B 6/0083* (2013.01); *G02B 6/0068* (2013.01); *G02B 6/0073* (2013.01);
(Continued)

(58) Field of Classification Search
CPC ..................... G02F 1/133615; G02F 1/133608
USPC .................................................. 362/600–634
See application file for complete search history.

(56) References Cited

U.S. PATENT DOCUMENTS

2006/0221637 A1*  10/2006  Chikugawa et al. .......... 362/612
2008/0304285 A1   12/2008  Iwasaki
(Continued)

FOREIGN PATENT DOCUMENTS

| JP | 2007-256763 A | 10/2007 |
| JP | 2008-305652 A | 12/2008 |
| JP | 2009-054563 A | 3/2009 |
| WO | 2009/118941 A1 | 10/2009 |

OTHER PUBLICATIONS

Official Communication issued in International Patent Application No. PCT/JP2011/061381, mailed on Jul. 19, 2011.

*Primary Examiner* — Sean Gramling
(74) *Attorney, Agent, or Firm* — Keating & Bennett, LLP

(57) ABSTRACT

Provided is an edge light type illuminating device, in which an adverse effect of noise and the amount of electric wires are decreased by reducing the length of power supply wires arranged to supply electric power to light sources. An illuminating device (20) includes a chassis plate (22) having a square shape in a plan view, edge light type light sources (28) disposed along at least one side face of the plate and another side face perpendicular to the one side face, power supply means (30) arranged to supply electric power to the light sources, and a power supply wire arranged to electrically connect the light sources and the means, wherein at least a portion of the power supply wire includes bridging wires (33ac, 33bd) arranged to connect the light sources perpendicular to each other.

10 Claims, 9 Drawing Sheets

(51) Int. Cl.
  *F21V 8/00* (2006.01)
  *G09G 1/00* (2006.01)
  *G09G 3/34* (2006.01)
(52) U.S. Cl.
  CPC ...... *G09G 3/3406* (2013.01); *G09G 2300/0426* (2013.01); *G09G 2330/02* (2013.01); *G09G 2330/06* (2013.01)
  USPC ............ 362/612; 362/613; 362/630; 362/631

(56) References Cited

U.S. PATENT DOCUMENTS

| | | |
|---|---|---|
| 2009/0059579 A1 | 3/2009 | Shin et al. |
| 2010/0165237 A1* | 7/2010 | Jung ............................... 349/58 |
| 2011/0007239 A1 | 1/2011 | Hamada |

\* cited by examiner

LIQUID CRYSTAL DISPLAY DEVICE, ILLUMINATING DEVICE, AND TELEVISION RECEIVING DEVICE

TECHNICAL FIELD

The present invention relates to a liquid crystal display device including a so-called edge light type illuminating device, an edge light type illuminating device, and a television receiving device including the liquid crystal display device or the illuminating device.

BACKGROUND ART

A liquid crystal display device including a transmissive liquid crystal display panel includes an illuminating device arranged to project light onto the liquid crystal display panel. The illuminating device includes, as light sources, small fluorescent tubes called cold cathode fluorescent tubes (CCFLs), or light emitting diodes (LEDs).

The basic structure of the illuminating device varies depending on the positions at which the light sources are disposed. A direct type illuminating device and an edge light type illuminating device are generally known. The direct type illuminating device defines an illuminating device including light sources disposed directly beneath a liquid crystal display panel. The edge light type illuminating device defines an illuminating device including light sources disposed on a side face of a liquid crystal display panel. Because the edge light type illuminating device has the configuration that the light sources are disposed on the side face, a thinner profile of the edge light type illuminating device can be advantageously achieved.

A power supply board (power supply means) disposed in the liquid crystal display device is arranged to supply electric power to the light sources such as LEDs. That is, the light sources and the power supply board are electrically connected to each other via electric wires (and connectors) that are routed in the liquid crystal display device (e.g., PTL 1). FIG. 9 is a view for illustrating a configuration of a wiring route in an edge light type illuminating device (LED light sources). In the configuration of the edge light type illuminating device shown in FIG. 9, the LED light sources are disposed along two sides (long sides) of a liquid crystal display device having a rectangular shape when seen in a plan view.

Generally, the LED light sources are mounted on long and thin LED boards 102 (upper LED boards 102a, lower LED boards 102b), and connected in series to each other. The LED boards 102 on which the LED light sources are mounted are disposed inside (along inner faces) of a chassis plate 104 having the shape of a shallow tray. Meanwhile, a power supply board 106 is disposed outside of the chassis 104. Power supply wires 108 drawn from the power supply board 106 are drawn into the inside of the chassis from a corner of the rectangular-shaped chassis plate 104 (from the lower right corner in FIG. 9). Electric wires (two electric wires) 108a for upper LEDs among the electric wires 108 drawn into the inside of the chassis are connected to both the ends (the positive side and the negative side) of the upper LED boards 102a. In addition, while one of two electric wires 108b for lower LEDs goes around to be routed through an upper portion of the chassis plate 104 (i.e., through the side where the upper LED boards are disposed), the two electric wires 108b for lower LEDs are connected to both the ends (the positive side and the negative side) of the lower LED boards 102b.

The reasons why one of the two electric wires 108b for lower LEDs goes around to be routed through the upper portion of the chassis plate 104 are cited below: 1) being routed part of the way on the same route as the electric wires 108a for upper LEDs, the one of the two electric wires 108b for lower LEDs can be tied with the electric wires 108a for upper LEDs, which can save space for housing the power supply wires 108; and 2) an adverse effect of noise caused by the power supply wires 108 (i.e., electromagnetic interference (EMI)) can be prevented from being exercised on source boards arranged to supply source signals to a liquid crystal display panel, the source boards being often disposed at a lower portion of a liquid crystal display device.

Citation List

Patent Literature

PTL 1: JP 2007-256763

SUMMARY OF INVENTION

Technical Problem

However, because the power supply wires are long in the liquid crystal display device having the configuration of the wiring route shown in FIG. 9, there arises a problem that an adverse effect of noise (unnecessary radiation) caused by or exercised on the power supply wires is significantly produced. For this reason, the cost of noise prevention rises.

In addition, if a large liquid crystal display device is used, the amount of electric wires increases to cause a problem that the cost of the power supply wires themselves rises.

In addition, if a liquid crystal display device including light sources along the four sides of a chassis plate is used in order to secure the amount of light, because the light sources along the right and left sides of the chassis plate and electric wires arranged to connect these light sources with a power supply board are further required, the problem of the adverse effect of noise and the problem of the cost of the electric wires are aggravated.

An object of the present invention is to provide a liquid crystal display device, an illuminating device, and a television receiving device, in which an adverse effect of noise and the amount of electric wires are decreased by reducing the length of power supply wires that are arranged to supply electric power to light sources.

Solution to Problem

To achieve the objects and in accordance with the purpose of the present invention, a liquid crystal display device of the present invention includes a liquid crystal display panel, and an illuminating device that is disposed on a back side face of the liquid crystal display panel, is arranged to project light onto the liquid crystal display panel, and includes a chassis plate having a square shape when seen in a plan view, edge light type light sources that are disposed along at least one side face of the chassis plate and another side face of the chassis plate that is perpendicular to the one side face, power supply means arranged to supply electric power to the light sources, and a power supply wire arranged to electrically connect the light sources and the power supply means, wherein at least a portion of the power supply wire includes a bridging wire arranged to connect the light source disposed along the one side face of the chassis plate and the light source disposed along the another side face of the chassis plate that is perpendicular to the one side face.

In this case, it is preferable that the light sources define light sources that are each disposed along four side faces of the chassis plate.

In addition, it is preferable that one end of each power supply wire, which defines a portion of each power supply wire, is connected to the power supply means at a substantial center of the chassis plate.

In this case, it is preferable that the light sources define a plurality of LED light sources mounted on each of LED boards that are disposed along the side faces of the chassis plate, and that at least one of the LED boards is connected, at its end on one corner of the chassis plate, to the power supply means by the power supply wire, and connected by the bridging wire to another LED board that adjoin the at least one LED board while sandwiching another corner of the chassis plate.

In addition, it is preferable that the light sources define a plurality of LED light sources mounted on each of LED boards that are disposed along the side faces of the chassis plate, that each of the LED boards are divided into a plurality of LED boards on each of the side faces of the chassis plate, and that the LED boards that are disposed along two opposing side faces of the chassis plate are connected to the power supply means by the power supply wires, and among the LED boards disposed along the two opposing side faces, the LED boards that are closest to the corners of the chassis plate are connected by the bridging wires to some of the LED boards that are disposed along the other two opposing side faces of the chassis plate, the some of the LED boards adjoining the LED boards closest to the corners while sandwiching the corners.

In this case, it is preferable that the light sources define the plurality of LED light sources mounted on each of the LED boards that are disposed along the side faces of the chassis plate, that the LED boards are divided into eight LED boards in middle portions of the side faces of the chassis plate, and that the four LED boards that are disposed along two opposing side faces of the chassis plate are connected to the power supply means by the power supply wires in the middle portions of the side faces of the chassis plate, and connected by the bridging wires to the other four LED boards that are disposed along the other two opposing side faces of the chassis plate and adjoin the four LED boards connected to the power supply means sandwiching the corners of the chassis plate.

In another aspect of the present invention, an illuminating device of the present invention includes a chassis plate having a square shape when seen in a plan view, edge light type light sources that are disposed along at least one side face of the chassis plate and another side face of the chassis plate that is perpendicular to the one side face, power supply means arranged to supply electric power to the light sources, and a power supply wire arranged to electrically connect the light sources and the power supply means, wherein at least a portion of the power supply wire includes a bridging wire arranged to connect the light source disposed along the one side face of the chassis plate and the light source disposed along the another side face of the chassis plate that is perpendicular to the one side face.

In this case, it is preferable that the light sources define light sources that are each disposed along four side faces of the chassis plate.

In addition, it is preferable that one end of each power supply wire, which defines a portion of each power supply wire, is connected to the power supply means at a substantial center of the chassis plate.

In this case, it is preferable that the light sources define a plurality of LED light sources mounted on each of LED boards that are disposed along the side faces of the chassis plate, and that at least one of the LED boards is connected, at its end on one corner of the chassis plate, to the power supply means by the power supply wire, and connected by the bridging wire to another LED board that adjoin the at least one LED board while sandwiching another corner of the chassis plate.

In addition, it is preferable that the light sources define a plurality of LED light sources mounted on each of LED boards that are disposed along the side faces of the chassis plate, that each of the LED boards are divided into a plurality of LED boards on each of the side faces of the chassis plate, and that the LED boards that are disposed along two opposing side faces of the chassis plate are connected to the power supply means by the power supply wires, and among the LED boards disposed along the two opposing side faces, the LED boards that are closest to the corners of the chassis plate are connected by the bridging wires to some of the LED boards that are disposed along the other two opposing side faces of the chassis plate, the some of the LED boards adjoining the LED boards closest to the corners while sandwiching the corners.

In this case, it is preferable that the light sources define the plurality of LED light sources mounted on each of the LED boards that are disposed along the side faces of the chassis plate, that the LED boards are divided into eight LED boards in middle portions of the side faces of the chassis plate, and that the four LED boards that are disposed along two opposing side faces of the chassis plate are connected to the power supply means by the power supply wires in the middle portions of the side faces of the chassis plate, and connected by the bridging wires to the other four LED boards that are disposed along the other two opposing side faces of the chassis plate and adjoin the four LED boards connected to the power supply means sandwiching the corners of the chassis plate.

Meanwhile, it is preferable that each of the LED light sources defines a blue light-emitting chip that is coated with a fluorescent material that has an emission peak wavelength in a yellow region, and the LED light sources are arranged to emit white light.

In addition, it is preferable that each of the LED light sources defines a blue light-emitting chip that is coated with a fluorescent material that has an emission peak wavelength in a green region and a red region, and the LED light sources are arranged to emit white light.

In addition, it is preferable that each of the LED light sources defines a blue light-emitting chip that is coated with a fluorescent material that has an emission peak wavelength in a green region, and a red light-emitting chip, and the LED light sources are arranged to emit white light.

In addition, it is preferable that each of the LED light sources defines a blue light-emitting chip, a green light-emitting chip, and a red light-emitting chip, and the LED light sources are arranged to emit white light.

In addition, it is preferable that each of the LED light sources defines an ultraviolet light chip and a fluorescent material, and the LED light sources are arranged to emit white light.

In addition, it is preferable that each of the LED light sources defines an ultraviolet light chip that is coated with a fluorescent material that has an emission peak wavelength in a blue region, a green region, and a red region, and the LED light sources are arranged to emit white light.

In another aspect of the present invention, a television receiving device includes the display device or the illuminating device described above.

Advantageous Effects of Invention

Because the liquid crystal display device, the illuminating device and the television receiving device have the configuration that the light sources are disposed along the side faces of the chassis plate that are perpendicular to each other (disposed so as to have the shape of the letter "L") and connected to each other by the bridging wire along the corner of the chassis plate, the length of the power supply wire can be reduced. Thus, the reduced length of the power supply wire can decrease an adverse effect of noise (unnecessary radiation) caused by or exercised on the power supply wire (can decrease the cost of noise prevention). In addition, the reduced length of the power supply wire can decrease the amount of electric wires used in one liquid crystal display device.

In the configuration that the light sources are each disposed along the four side faces of the chassis plate (configuration that the number of the light sources adjoining one another sandwiching the corners of the chassis plate is larger), an effect achieved by reducing the length of the power supply wires by using the bridging wires can be further enhanced.

In addition, in the configuration that the one end of each power supply wire, which is the portion of each power supply wire, is connected to the power supply means at the substantial center of the chassis plate, the distances between the power supply means and the light sources can be decreased, which allows the length of the electric wires to be reduced further.

DESCRIPTION OF EMBODIMENTS

Figure 1:
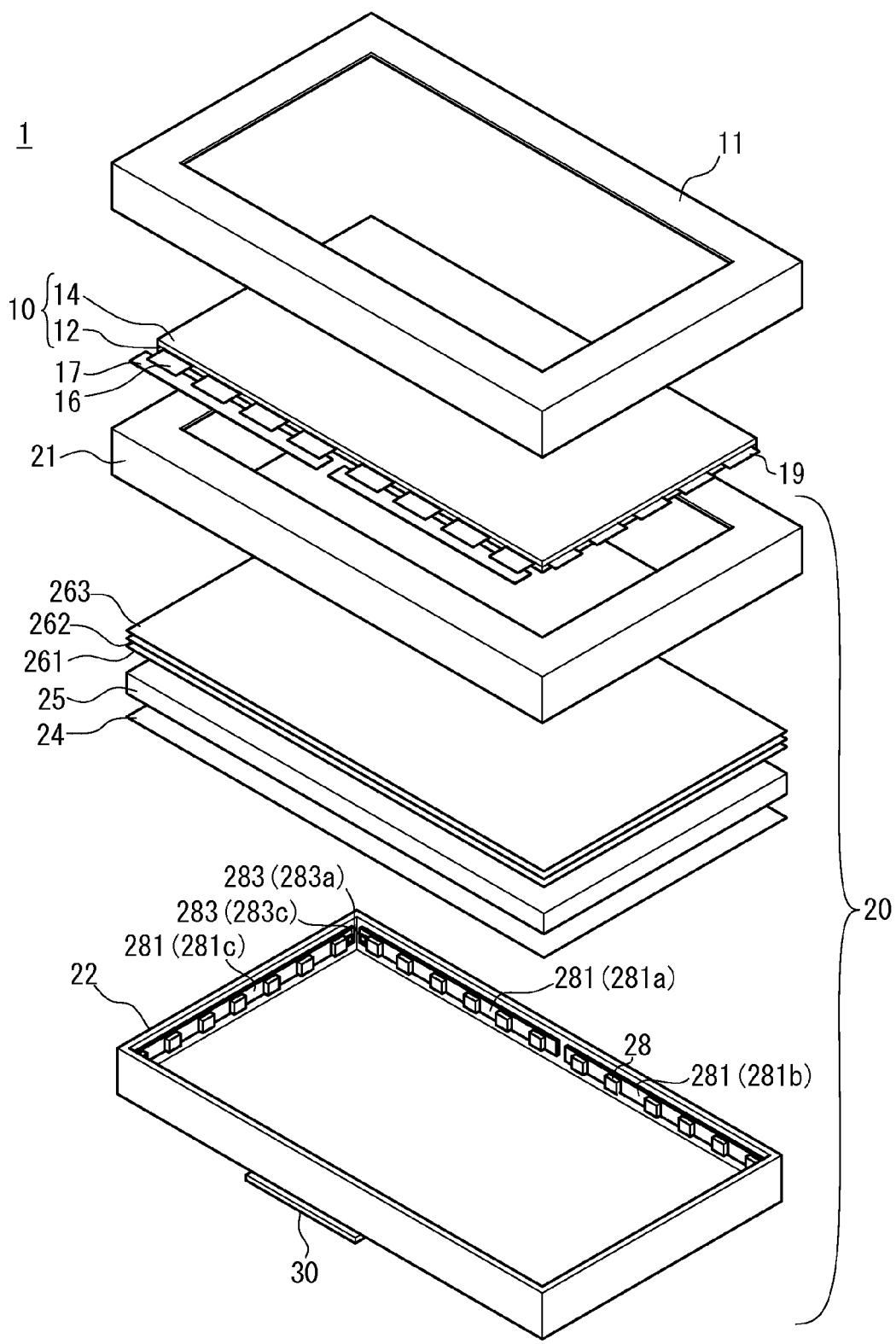
FIG. 1 is an exploded perspective view showing a liquid crystal display device of a preferred embodiment of the present invention.
Figure 2:
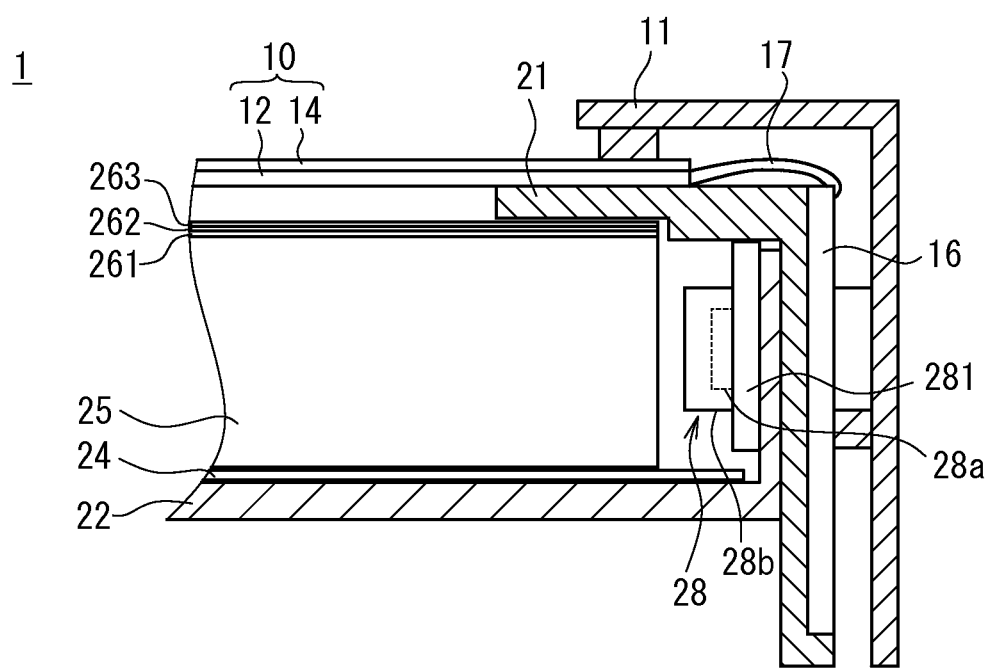
FIG. 2 is an enlarged cross-sectional view showing the liquid crystal display device shown in FIG. 1.

Detailed descriptions of preferred embodiments of the present invention will now be provided with reference to the accompanying drawings. FIG. 1 is an exploded perspective view showing a liquid crystal display device 1 of a first preferred embodiment of the present invention. FIG. 2 is an enlarged cross-sectional view showing the liquid crystal display device 1. In the following descriptions, unless otherwise noted, a front side of the liquid crystal display device 1 refers to the tops of FIGS. 1 and 2, and a back side of the liquid crystal display device 1 refers to the bottoms of FIGS. 1 and 2. In addition, a right side, a left side, an upper side, and a lower side of the liquid crystal display device 1 refer to the sides of the liquid crystal display device 1 when the liquid crystal display device 1 (a liquid crystal display panel 10) is seen from an anterior view. In FIGS. 1 and 2, power supply wires for LED light sources 28 are not illustrated.

The liquid crystal display device 1 of the present embodiment includes the liquid crystal display panel 10 and an illuminating device 20. The liquid crystal display panel 10 includes a thin film transistor (TFT) array substrate 12 (hereinafter, referred to simply as the array substrate 12) and a color filter (CF) substrate 14, and is fixed by a bezel 11 having a frame shape. The array substrate 12 and the color filter substrate 14 are opposed to each other having a given cell gap therebetween, in which liquid crystals are filled.

The array substrate 12 defines a glass substrate on which TFTs and pixel electrodes are arranged in a matrix. The color filter substrate 14 defines a glass substrate same in size as the array substrate 12, on which a plurality of color filters are arranged in a matrix, and over the entire surface of which a transparent common electrode is formed. By varying a voltage applied to the pixel electrodes and the common electrode, alignment of the liquid crystals is controlled.

Source boards 16 and a source driver 17 that are arranged to supply source signals are disposed along a lower side face of the liquid crystal display panel 10. The source boards 16 are mechanically and electrically connected to the liquid crystal display panel 10 via the source driver 17 that defines a flexible substrate. In addition, gate drives 19 that are arranged to supply gate signals are disposed on a right side face of the liquid crystal display panel 10. In the present embodiment, no gate substrate is provided.

The illuminating device 20 (an illuminating device of a preferred embodiment of the present invention) is disposed on a back side face of the liquid crystal display panel 10. The illuminating device 20 of the present embodiment defines an LED backlight including the LED light sources 28 as its light sources. The LED light sources 28 are disposed along two opposing side faces of the liquid crystal display panel 10 (along two opposing side faces of a chassis plate 22 to be described later). That is, the illuminating device 20 defines a so-called "edge light type" illuminating device.

The illuminating device 20 includes a frame 21, the chassis plate 22, a reflection sheet 24, a light guide plate 25, optical sheets 261, 262, 263, the LED light sources 28, and a power supply board 30 as shown in FIGS. 1 and 2.

The frame 21 has a rectangular frame shape, where the sides which form the frame have the shape of the letter "L" in cross section. The frame 21 is arranged to hold the reflection sheet 24, the light guide plate 25, and the optical sheets 261, 262, 263, which are stacked on the chassis plate 22, inside of the chassis plate 22. That is, the reflection sheet 24, the light guide plate 25, and the optical sheets 261, 262, 263 are disposed in a space formed by the frame 21 and the chassis plate 22 as shown in FIG. 2.

The chassis plate 22 is made from aluminum or an aluminum alloy, and has the shape of a box of low height, which is square when seen in a plan view. The LED light sources 28 mounted on LED boards 281 are disposed on inside faces of the chassis plate 22. To be specific, the LED light sources 28 are arranged to project light from lateral sides of the chassis plate 22 toward the center of the chassis plate 22. The reflection sheet 24 is laid on an inner bottom face of the chassis plate 22, and the light guide plate 25 is disposed on the reflection sheet 24. The optical sheets 261, 262, 263 are disposed on the light guide plate 25. Thus, as described above, the reflection sheet 24, the light guide plate 25, and the optical sheets 261, 262, 263 are disposed in the space formed by the frame 21 and the chassis plate 22.

The reflection sheet 24 is arranged to efficiently reflect the light that is emitted from the lateral sides of the chassis plate 22 by the LED light sources 28 toward the liquid crystal display panel 10. The light guide plate 25 on the reflection sheet 24 is arranged to planarly diffuse the light reflected by the reflection sheet 24. Using the reflection sheet 24 and the light guide plate 25 can enhance the luminance of light that is emitted from the light sources disposed along the lateral side faces of the chassis plate 22 (the liquid crystal display panel 10) (edge light) and reaches the panel surface, and allows uniformalization of the luminance in a plane direction of the liquid crystal display panel 10.

The optical sheets 261, 262, 263 define thin resin sheets having a rectangular shape when seen in a plan view. The optical sheets 261, 262, 263 are used in combination, and the combination can be selected as appropriate in accordance with the properties required of the liquid crystal display device 1. Specific combinations of the optical sheets 261, 262, 263 include a combination of the diffusion sheet 261, the lens sheet 262 and the reflection sheet 263, which are disposed in this order from the bottom. The diffusion sheet 261 allows further uniformalization of the luminance in the plane direction of the light that reaches the liquid crystal display panel 10. The lens sheet 262 is arranged to gather the light that has passed through the diffusion sheet 261 to allow enhancement of the luminance of the light. The reflection sheet 263 is arranged to transmit polarized light in a given direction (light that is polarized in a given direction) while reflecting polarized light other than the polarized light in the given direction so that the light that has reached the liquid crystal display panel 10 is not absorbed by a polarizing plate attached on a photo-receiving face (a lower face) of the liquid crystal display panel 10.

The LED light sources 28 are disposed along at least one side face of the chassis plate 22 and another side face of the chassis plate 22 that is perpendicular to the one side face. In the present embodiment, the LED light sources 28 are disposed along the four side faces of the chassis plate 22. To be specific, the plurality of LED boards 281 are disposed on the inside faces of the chassis plate 22. The plurality of the LED light sources 28 are mounted on each LED board 281. Thus, the LED light sources 28 are disposed along the four side faces of the chassis plate 22, that is, along the four side faces of the liquid crystal display panel 10 disposed in front of the illuminating device 20.

The LED light sources 28 define so-called white LED light sources arranged to emit white light. Examples of the configuration of each LED light source 28 include 1) a configuration such that a blue light-emitting chip that is coated with a fluorescent material that has an emission peak wavelength in a yellow region so as to emit white light, 2) a configuration such that a blue light-emitting chip that is coated with a fluorescent material that has an emission peak wavelength in a green region and a red region so as to emit white light, 3) a configuration such that a blue light-emitting chip is coated with a fluorescent material that has an emission peak wavelength in a green region and used in combination with a red light-emitting chip so as to emit white light, 4) a configuration such that a blue light-emitting chip, a green light-emitting chip and a red light-emitting chip are used in combination so as to emit white light, 5) a configuration such that an ultraviolet light chip is used in combination with a fluorescent material so as to emit white light, and 6) a configuration such that an ultraviolet light chip is coated with a fluorescent material that has an emission peak wavelength in a blue region, a green region and a red region so as to emit white light. In the present embodiment, the LED light sources 28, which are disposed so as to have the shape of the letter "L" to be described later, are used to improve display performance (performance such as luminance, luminance unevenness, and color unevenness).

In the present embodiment, two LED boards 281 are disposed along the upper side face of the chassis plate 22, and two LED boards 281 are disposed along the lower side face of the chassis plate 22. The four LED boards 281 are same in size, and disposed so as to be horizontally symmetrical with respect to center lines to bisect the chassis plate 22 (the liquid crystal display panel 10) (center lines to horizontally and vertically bisect the chassis plate 22). The LED light sources 28 mounted on one LED board 281 are same in number as LED light sources 28 mounted on another LED board 281. In addition, one LED board 281 is disposed along the left side face of the chassis plate 22, and one LED board 281 is disposed along the right side face of the chassis plate 22 (see FIG. 3 to be described later).

Hereinafter, in order to distinguish the LED boards 281, the LED board 281 that is disposed along the upper side face of the chassis plate 22 on the left as facing the liquid crystal display panel 10 is sometimes referred to as an upper left LED board 281a. The LED board 281 that is disposed along the upper side face of the chassis plate 22 on the right as facing the liquid crystal display panel 10 is sometimes referred to as an upper right LED board 281b. The LED board 281 that is disposed along the left side face of the chassis plate 22 is sometimes referred to as a left LED board 281c. The LED board 281 that is disposed along the right side face of the chassis plate 22 is sometimes referred to as a right LED board 281d. The LED board 281 that is disposed along the lower side face of the chassis plate 22 on the left as facing the liquid crystal display panel 10 is sometimes referred to as a lower left LED board 281e. The LED board 281 that is disposed along the lower side face of the chassis plate 22 on the right as facing the liquid crystal display panel 10 is sometimes referred to as a lower right LED board 281f.

Wiring patterns arranged to supply electric power to the mounted LED light sources 28 are formed on the LED boards 281. In the present embodiment, the LED light sources 28 mounted on each LED board 281 are connected in series to each other by the wiring patterns. In addition, a power supply connector 282 or a relay connector 283 is disposed at each end portion of the LED boards 281. The positional relations of the connectors are described later.

The LED light sources 28 are electrically connected via the power supply connectors 282 and the relay connectors 283 to the power supply board 30 disposed behind the chassis plate 22 (the power supply board 30 corresponds to power supply means in the present invention) by the power supply wires. The power supply board 30 includes an LED control unit made up from an IC chip and other components. The LED control unit is arranged to on/off control the LED light sources 28. Because the power supply board 30 is disposed behind the chassis plate 22, the chassis plate 22 includes through-holes (not illustrated) through which the power supply wires are passed (are led to the front side of the chassis plate 22).

A control board (not illustrated) arranged to control the liquid crystal display panel 10 (TFT) is sometimes provided next to the power supply board 30 having the configuration described above.

Figure 3:
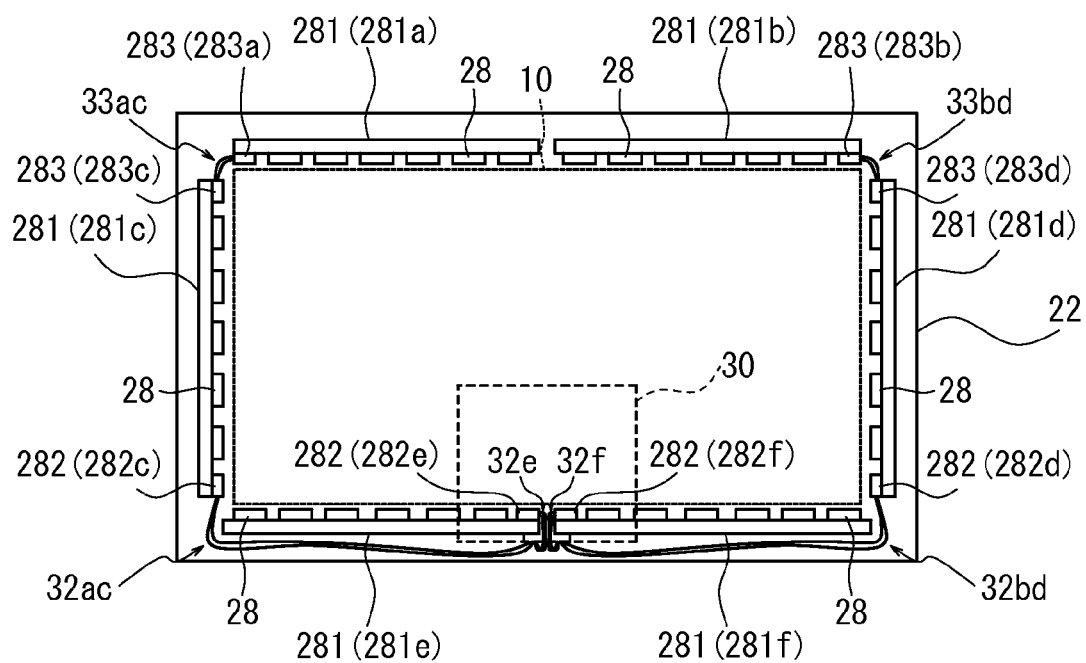
FIG. 3 is a schematic view for illustrating a connecting structure between LED light sources and a power supply board with the use of power supply wires.

Hereinafter, a detailed description of an electric connecting structure between the LED light sources 28 (the LED boards 281) and the power supply board 30 will be provided. FIG. 3 is a view for illustrating the connecting structure, which is a schematic plan view showing the components of the illuminating device 20 that are seen from the front side. The outer shape of the liquid crystal display panel 10 is shown only as a guide by the dotted line in FIG. 3. In addition, the chassis plate 22 is shown slightly larger in FIG. 3 in order to make this view clearly understandable.

First, the positions of the power supply connectors 282 or the relay connectors 283 disposed on the LED boards 281 are described. As shown in FIG. 3, in the upper left LED board 281a, the relay connector 283a is disposed at the left end portion (at the upper left corner of the chassis plate 22). In the upper right LED board 281b, the relay connector 283b is disposed at the right end portion (at the upper right corner of the chassis plate 22). In the left LED board 281c, the power supply connector 282c is disposed at the lower end portion (at the lower left corner of the chassis plate 22), and the relay connector 283c is disposed at the upper end portion (at the upper left corner of the chassis plate 22). In the right LED board 281d, the power supply connector 282d is disposed at the lower end portion (at the lower right corner of the chassis plate 22), and the relay connector 283d is disposed at the upper end portion (at the upper right corner of the chassis plate 22). In the lower left LED board 281e, the power supply connector 282e is disposed at the right end portion. In the lower right LED board 281f, the power supply connector 282f is disposed at the left end portion.

To be specific, the relay connectors 283a and 283c are disposed at the positions adjoining each other sandwiching the upper left corner of the chassis plate (the liquid crystal display panel 10). The relay connectors 283b and 283d are disposed at the positions adjoining each other sandwiching the upper right corner of the chassis plate 22 (the liquid crystal display panel 10).

Figure 4A:
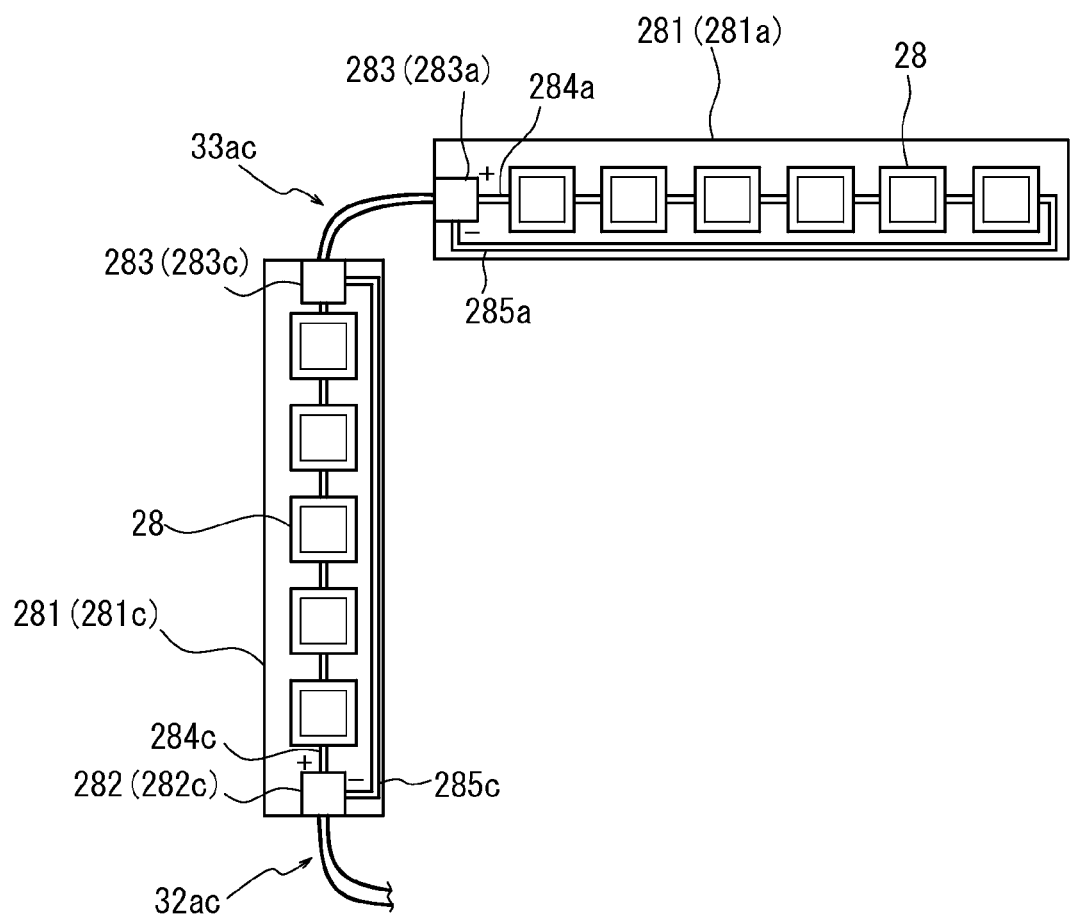
FIGS. 4A and 4B are views showing a schematic configuration on LED boards included in the liquid crystal display device shown in FIG. 1.
Figure 4B:
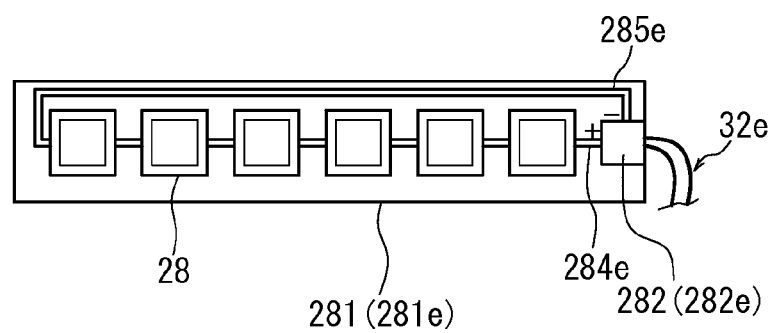

FIGS. 4A and 4B are views showing a schematic configuration on the LED boards 281 including the power supply connectors 282 and the relay connectors 283. In FIG. 4A, the upper left LED board 281a, and the left LED board 281c that is connected thereto are shown. In FIG. 4B, the lower left LED board 281e is shown.

In the upper left LED board 281a shown in FIG. 4A, the LED light sources 28 mounted on the board are connected in series to each other by the wiring patterns formed on the board. In addition, the relay connector 283a is mounted at the left end portion of the board. Among the wiring patterns, a positive wire 284a that is connected to a positive electrode of the LED light sources 28 is connected to a positive terminal (not illustrated) of the relay connector 283a, while a negative wire 285a that is connected to a negative electrode of the LED light sources 28 and turns around at the right end portion of the board is connected to a negative terminal (not illustrated) of the relay connector 283a. In the relay connector 283a, these positive and negative terminals are fixed to a connector housing. In other words, a positive and negative connector is provided at the left end portion of the upper left LED board 281a.

In addition, in the left LED board 281c, the LED light sources 28 mounted on the board are connected in series to each other by the wiring patterns that define a portion of the power supply wires formed on the board. In addition, the relay connector 283c is mounted at the upper end portion of the board, and the power supply connector 282c is mounted at the lower end portion of the board. In the relay connector 283c and the power supply connector 282c, positive and negative terminals are fixed to connector housings (not illustrated). One end of a wiring pattern 284c (a positive wire) that connects the LED light sources 28 is connected to the positive terminal of the relay connector 283c, while the other end is connected to the positive terminal of the power supply connector 282c. In addition, a wiring pattern 285c connects the negative terminal of the relay connector 283c and the negative terminal of the power supply connector 282c.

Then, the positive terminal and the negative terminal of the relay connector 283a of the upper left LED board 281a are electrically connected, directly by bridging wires 33ac, to the positive terminal and the negative terminal of the relay connector 283c of the left LED board 281c, respectively. The bridging wires 33ac define a portion of the power supply wires. Thus, the LED light sources 28 mounted on the upper left LED board 281a and the left LED board 281c are made connected in series to each other over the two boards. In addition, the positive side and the negative side of the LED light sources 28 connected in series to each other are made connected to the positive terminal and the negative terminal of the power supply connector 282c of the left LED board 281c. In other words, the power supply connector 282c functions as a positive and negative connector for the LED light sources 28 that are connected in series to each other over the two boards.

As shown in FIG. 3, power supply electric wires 32a (a pair of positive and negative electric wires) that define a portion of the power supply wires drawn from the power supply board 30 are connected to the power supply connector 282c. The power supply board 30 is disposed at a lower portion of the chassis plate 22. One ends of power supply wires 32ac are electrically connected to the power supply board 30 in the middle of the lower portion of the chassis plate 22. The other ends of the power supply wires 32ac are electrically connected to the LED light sources 28 mounted on the upper left LED board 281a and the left LED board 281c via the power supply connector 282c. This configuration allows electrical connection between the power supply board 30 and the LED light sources 28 mounted on the upper left LED board 281a and the left LED board 281c.

The configuration on the upper right LED board 281b and the right LED board 281d and the configuration shown in FIG. 4A are symmetrical with respect to the center line to horizontally bisect the chassis plate 22, so that a detailed description of the configuration on the upper right LED board 281b and the right LED board 281d is not provided. That is, the upper right LED board 281b is different from the upper left LED board 281a in that the upper right LED board 281b has the configuration that the relay connector 283b is disposed at the right end portion of the board while the upper left LED board 281a has the configuration that the relay connector 283a is disposed at the left end portion of the board. In addition, the right LED board 281d has the same configuration as the left LED board 281c. The LED light sources 28 mounted on the upper right LED board 281b and the right LED board 281d are made connected in series to each other over the two boards by bridging wires 33bd. The power supply connector 282d, which functions as a positive and negative connector for the LED light sources 28 that are connected in series to each other over the two boards, is disposed at the lower end portion of the right LED board 281d.

Thus, the power supply board 30 is made electrically connected to the LED light sources 28 mounted on the upper left LED board 281a and the left LED board 281c via power supply electric wires 32bd as shown in FIG. 3.

Meanwhile, also in the lower left LED board 281e shown in FIG. 4B, the LED light sources 28 mounted on the board are connected in series to each other by the wiring patterns that define a portion of the power supply wires formed on the board. The power supply connector 282e is disposed at the right end portion of the board. Among the wiring patterns, a positive wire 284e that is connected to a positive electrode of the LED light sources 28 is connected to a positive terminal (not illustrated) of the power supply connector 282e, while a negative wire 285e that is connected to a negative electrode of the LED light sources 28 and turns around at the left end portion of the board is connected to a negative terminal (not illustrated) of the power supply connector 282e. In the power supply connector 282e, the positive and negative terminals are fixed to a connector housing (not illustrated). In other words, the power supply connector 282e functions as a positive and negative connector for the LED light sources 28 mounted on the lower left LED board 281e.

As shown in FIG. 3, power supply electric wires 32e (a pair of positive and negative electric wires) that define a portion of the power supply wires drawn from the power supply board 30 are connected to the power supply connector 282e. To be specific, the one ends of the power supply wires 32ac are electrically connected to the power supply board 30 in the middle of the lower portion of the chassis plate 22. The other ends of the power supply wires 32ac are electrically connected to the LED light sources 28 mounted on the lower left LED board 281e via the power supply connector 282e. This configuration allows electrical connection between the power supply board 30 and the LED light sources 28 mounted on the lower left LED board 281e.

The lower right LED board 281f and the lower left LED board 281e are symmetrical with respect to the center line to horizontally bisect the chassis plate 22, so that a detailed description of the lower right LED board 281f is not provided. A power supply connector 282f, which functions as a positive and negative connector, is disposed at the left end portion of the lower right LED board 281e.

Thus, the power supply board 30 is made electrically connected to the LED light sources 28 mounted on the lower right LED board 281f via power supply electric wires 32f as shown in FIG. 3.

As described above, in the liquid crystal display device 1 of the present embodiment, the LED light sources 28 on the upper left LED board 281a disposed along the upper side face of the chassis plate 22, and the LED light sources 28 on the left LED board 281c disposed along the left side face of the chassis plate 22 are electrically connected to each other via the bridging wires 33ac that define a portion of the power supply wires. Likewise, the LED light sources 28 on the upper right LED board 281b disposed along the upper side face of the chassis plate 22, and the LED light sources 28 on the left LED board 281d disposed along the left side face of the chassis plate 22 are electrically connected to each other via the bridging wires 33bd. With the configuration that the boards that are apart from each other (on the corner sides) are electrically connected to each other by the bridging wires 33ac and the bridging wires 33bd while the LED light sources 28 are disposed so as to have the shape of the letter "L", the length of the power supply electric wires can be reduced.

Thus, the reduced length of the power supply wires can decrease an adverse effect of noise (unnecessary radiation) caused by or exercised on the power supply wires (can decrease the cost of noise prevention). In addition, the reduced length of the power supply wires can decrease the amount of electric wires used in one liquid crystal display device.

In addition, with the configuration that the LED light sources 28 (the LED boards 281) and the power supply wires are symmetrical with respect to the center line to horizontally bisect the chassis plate 22 (the liquid crystal display panel 10) like the present embodiment, the lengths of the power supply electric wires can be made symmetrically equal to each other. That is, the length of the bridging wires 33ac can be made equal to the length of the bridging wires 33bd. The length of the power supply wires 32ac can be made equal to the length of the power supply wires 32bd. The length of the power supply wires 32e can be made equal to the length of the power supply wires 32f. Thus, the kinds of the components can be reduced.

Hereinafter, a detailed description of another preferred embodiment of the present invention will be provided. In the present embodiment, a detailed description of LED boards is not provided, and a description of a wiring route of power supply wires will be mainly provided. A configuration such that connectors provided on the LED boards define positive and negative connectors, each of which includes a positive terminal and a negative terminal, is similar to that of the first embodiment.

Figure 5:
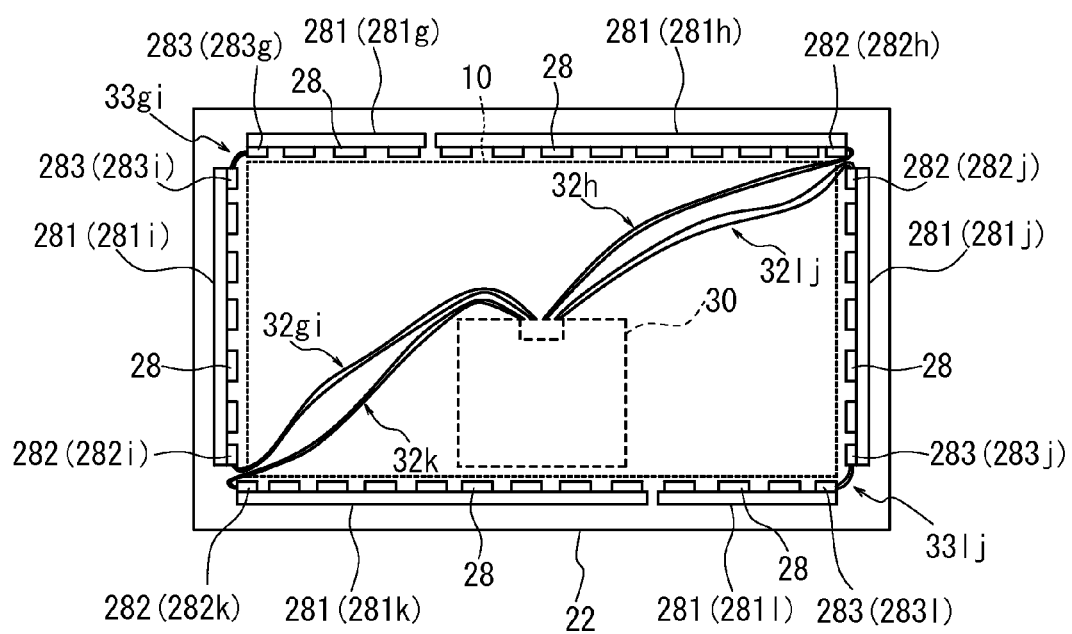
FIG. 5 is a schematic view for illustrating a connecting structure between LED light sources and a power supply board with the use of power supply wires in a liquid crystal display device of a second preferred embodiment of the present invention.

FIG. 5 is a view for illustrating an electrical connecting structure between LED light sources 28 (LED boards 281) and a power supply board 30 in a liquid crystal display device of the present second embodiment of the present invention, which is a schematic plan view showing the components of an illuminating device 20 that are seen from the front side. The outer shape of a liquid crystal display panel 10 is shown only as a guide by the dotted line in FIG. 5. In addition, a chassis plate 22 is shown slightly larger in FIG. 5 in order to make this view clearly understandable.

In the present embodiment, the LED boards 281 are disposed along the four sides of the chassis plate 22. Each of the LED boards 281 disposed along the upper and lower side faces of the chassis plate 22 is divided into two pieces. One LED board 281 is disposed along the left side face of the chassis plate 22, and one LED board 281 is disposed along the right side face of the chassis plate 22.

Hereinafter, in order to distinguish the LED boards 281, the LED board 281 that is disposed along the upper side face of the chassis plate 22 on the left as facing the liquid crystal display panel 10 is sometimes referred to as an upper left LED board 281g. The LED board 281 that is disposed along the upper side face of the chassis plate 22 on the right as facing the liquid crystal display panel 10 is sometimes referred to as an upper right LED board 281h. The LED board 281 that is disposed along the left side face of the chassis plate 22 is sometimes referred to as a left LED board 281i. The LED board 281 that is disposed along the right side face of the chassis plate 22 is sometimes referred to as a right LED board 281j. The LED board 281 that is disposed along the lower side face of the chassis plate 22 on the left as facing the liquid crystal display panel 10 is sometimes referred to as a lower left LED board 281k. The LED board 281 that is disposed along the lower side face of the chassis plate 22 on the right as facing the liquid crystal display panel 10 is sometimes referred to as a lower right LED board 281l.

In the present embodiment, the upper left LED board 281g and the lower right LED board 281l are same in size (have the same number of LED light sources 28). In addition, the upper right LED board 281h and the lower left LED board 281k are same in size (have the same number of LED light sources 28). The upper left LED board 281g and the lower right LED board 281l are smaller in size than the upper right LED board 281h and the lower left LED board 281k. The number of LED light sources 28 mounted on each of the upper left LED board 281g and the lower right LED board 281l is smaller than the number of LED light sources 28 mounted on each of the upper right LED board 281h and the lower left LED board 281k.

Among these LED boards 281, the LED light sources 28 of the upper left LED board 281g are electrically connected to the LED light sources 28 of the left LED board 281i by bridging wires 33gi that define a portion of the power supply wires. This connecting structure is same as the connecting structure between the upper left LED board 281a and the left LED board 281c of the first embodiment. To be specific, a positive terminal and a negative terminal of a relay connector 283g of the upper left LED board 281g are electrically connected to a positive terminal and a negative terminal of a relay connector 283i of the left LED board 281i by the bridging wires 33gi, respectively. Thus, the LED light sources 28 mounted on the upper left LED board 281g and the left LED board 281i are made connected in series to each other over the two boards via the bridging wires 33gi. A power supply connector 282i disposed at the lower end portion of the left LED board 281i (at the lower left corner of the chassis plate 22) functions as a positive and negative connector for the LED light sources 28 that are connected in series to each other over the two boards.

In addition, the LED light sources 28 of the lower right LED board 281l are electrically connected to the LED light sources 28 of the right LED board 281j by bridging wires 33lj that define a portion of the power supply wires. This connecting structure is also same as the connecting structure between the upper left LED board 281a and the left LED board 281c of the first embodiment. To be specific, a positive terminal and a negative terminal of a relay connector 283l of the lower right LED board 281l are electrically connected to a positive terminal and a negative terminal of a relay connector 283j of the right LED board 281j by the bridging wires 33lj, respectively. Thus, the LED light sources 28 mounted on the lower right LED board 281l and the right LED board 281j are made connected in series to each other over the two boards via the bridging wires 33lj. A power supply connector 282j disposed at the upper end portion of the right LED board 281j (at the upper right corner of the chassis plate 22) functions as a positive and negative connector for the LED light sources 28 that are connected in series to each other over the two boards.

Meanwhile, the LED light sources 28 mounted on the upper right LED board 281h are connected in series to each other on the board, and the LED light sources 28 mounted on the lower left LED board 281k are connected in series to each other on the board. A power supply connector 282h, which functions as a positive and negative connector for the LED light sources 28 that are connected in series to each other on the board, is disposed at the right end portion of the upper right LED board 281h. Likewise, a power supply connector 282k, which functions as a positive and negative connector for the LED light sources 28 that are connected in series to each other on the board, is disposed at the left end portion of the lower left LED board 281k.

One ends of power supply wires 32gi that define a portion of the power supply wires are electrically connected to the power supply board 30 arranged to supply electric power to the LED light sources 28. The power supply wires 32gi are connected to the power supply board 30 at a substantial center of the chassis plate 22 as shown in FIG. 5. The other ends of the power supply wires 32gi are electrically connected to the LED light sources 28 mounted on the upper left LED board 281g and the left LED board 281i via the power supply connector 282i.

Thus, the left LED board 281i is connected to the power supply wires 32gi at its end on the lower left corner (one corner) of the chassis plate 22, while connected by the bridging wires 33gi to the upper left LED board 281g that adjoins the left LED board 281i sandwiching the upper left corner (another corner) of the chassis plate 22. This configuration allows electrical connection between the LED light sources 28 mounted on the upper left LED board 281g and the left LED board 281i, and the power supply board 30.

In addition, one ends of power supply wires 321j that define a portion of the power supply wires are electrically connected to the power supply board 30. The power supply wires 321j are connected to the power supply board 30 at a substantial center of the chassis plate 22 as shown in FIG. 5. The other ends of the power supply wires 321j are electrically connected to the LED light sources 28 mounted on the lower right LED board 281l and the right LED board 281j via the power supply connector 282j.

Thus, the right LED board 281j is connected to the power supply wires 321j at its end on the upper right corner (one corner) of the chassis plate 22, while connected by the bridging wires 33lj to the LED board 281l that adjoins the right LED board 281j sandwiching the lower right corner (another corner) of the chassis plate 22. This configuration allows electrical connection between the LED light sources 28 mounted on the lower right LED board 281l and the right LED board 281j, and the power supply board 30.

Meanwhile, the LED light sources 28 mounted on the upper right LED board 281h are electrically connected the power supply board 30 by the power supply wires 32h. In addition, the LED light sources 28 mounted on the lower left LED board 281k are electrically connected the power supply board 30 by the power supply wires 32k.

Similarly to the first embodiment, with the configuration of the present embodiment that the boards that are apart from each other (on the corner sides) are connected to each other so as to be bridged by the bridging wires 33gi and 33lj while the LED light sources 28 (the LED boards 281) are disposed so as to have the shape of the letter "L", the length of the power supply electric wires can be reduced. Thus, an adverse effect of noise (unnecessary radiation) caused by or exercised on the power supply wires (the cost of noise prevention) can be decreased. In addition, the reduced length of the power supply wires can decrease the amount of electric wires used in one liquid crystal display device.

Further, in the present embodiment, the lengths of the bridging wires 33gi and 33lj can be made equal to each other. In addition, the power supply wires 32gi, 321j, 32h and 32k are all connected to the power supply board 30 at the substantial center of the chassis plate 22 while connected to the LED boards 281 in the vicinities of the corners (opposing corners) of the chassis plate 22, so that the lengths of the power supply wires 32gi, 321j, 32h and 32k can be made equal to one another. Thus, the kinds of the components can be reduced.

In the present embodiment, it is preferable that the number of block 1) consisting of the LED light sources 28 mounted on the upper left LED board 281g and the left LED board 281i, the number of block 2) consisting of the LED light sources 28 mounted on the lower right LED board 281l and the right LED board 281j, the number of block 3) consisting of the LED light sources 28 mounted on the right LED board 281j, and the number of block 4) consisting of the LED light sources 28 mounted on the lower left LED board 281k are equal to one another. This is because, variations in electric load among blocks 1) to 4) described above, which are respectively connected to the power supply wires 32gi, the power supply wires 321j, the power supply wires 32h and the power supply wires 32k, can be reduced, which can simplify the configuration of the LED control unit (which allows easy control of the LED light sources 28).

Figure 6:
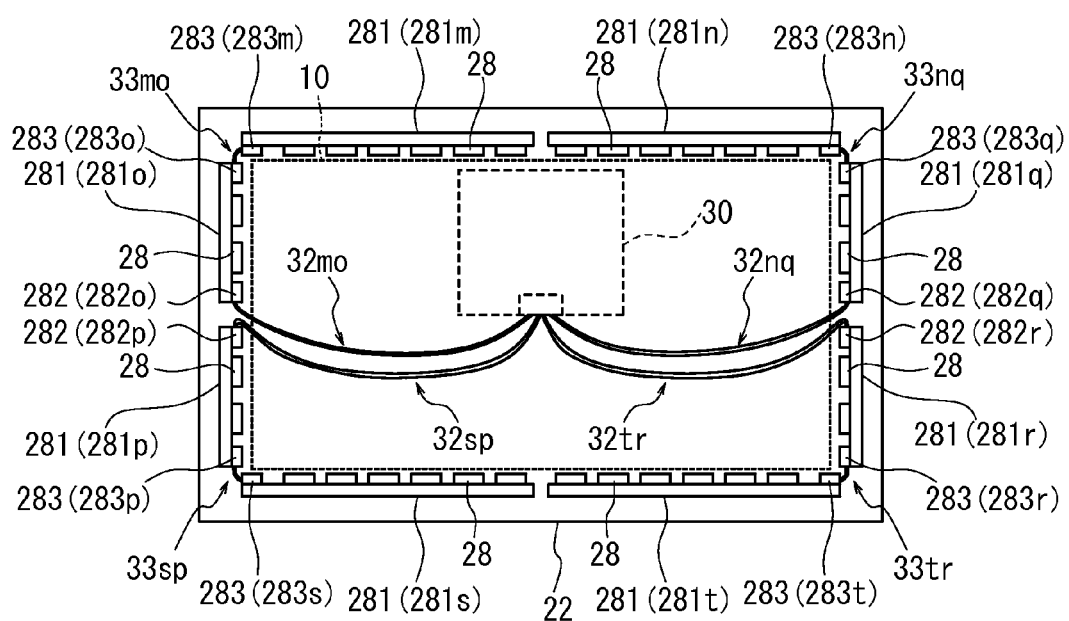
FIG. 6 is a schematic view for illustrating a connecting structure between LED light sources and a power supply board with the use of power supply wires in a liquid crystal display device of a third preferred embodiment of the present invention.

Next, a description of third embodiment of the present invention will be provided. FIG. 6 is a view for illustrating an electrical connecting structure between LED light sources 28 (LED boards 281) and a power supply board 30 in a liquid crystal display device of the present third embodiment of the present invention, which is a schematic plan view showing the components of an illuminating device 20 that are seen from the front side. The outer shape of a liquid crystal display panel 10 is shown only as a guide by the dotted line in FIG. 6. In addition, a chassis plate 22 is shown slightly larger in FIG. 6 in order to make this view clearly understandable.

In the present embodiment, the LED boards 281 are disposed along the four sides of the chassis plate 22. Each of the LED boards 281 disposed along the four side faces of the chassis plate 22 is divided into two pieces in a middle portion of each side face.

Hereinafter, in order to distinguish the LED boards 281, the LED board 281 that is disposed along the upper side face of the chassis plate 22 on the left as facing the liquid crystal display panel 10 is sometimes referred to as an upper left LED board 281m. The LED board 281 that is disposed along the upper side face of the chassis plate 22 on the right as facing the liquid crystal display panel 10 is sometimes referred to as an upper right LED board 281n. The LED board 281 that is disposed along the left side face of the chassis plate 22 on the upper side as facing the liquid crystal display panel 10 is sometimes referred to as a left upper LED board 281o. The LED board 281 that is disposed along the left side face of the chassis plate 22 on the lower side as facing the liquid crystal display panel 10 is sometimes referred to as a left lower LED board 281p. The LED board 281 that is disposed along the right side face of the chassis plate 22 on the upper side as facing the liquid crystal display panel 10 is sometimes referred to as a right upper LED board 281q. The LED board 281 that is disposed along the right side face of the chassis plate 22 on the lower side as facing the liquid crystal display panel 10 is sometimes referred to as a right lower LED board 281r. The LED board 281 that is disposed along the lower side face of the chassis plate 22 on the left as facing the liquid crystal display panel 10 is sometimes referred to as a lower left LED board 281s. The LED board 281 that is disposed along the lower side face of the chassis plate 22 on the right as facing the liquid crystal display panel 10 is sometimes referred to as a lower right LED board 281t.

In the present embodiment, the upper left LED board 281m, the upper right LED board 281n, the lower left LED board 281s, and the lower right LED board 281t are same in size (have the same number of LED light sources 28). In addition, the left upper LED board 281o, the left lower LED board 281p, the right upper LED board 281q, and the right lower LED board 281r are same in size (have the same number of LED light sources 28).

Among these LED boards 281, in the upper left LED board 281m and the left upper LED board 281o that adjoins the upper left LED board 281m sandwiching the upper left corner of the chassis plate 22, the LED light sources 28 of the upper left LED board 281m are electrically connected to the LED light sources 28 of the left upper LED board 281o by bridging wires 33mo that define a portion of the power supply wires.

This connecting structure is same as the connecting structure between the upper left LED board 281a and the left LED board 281c of the first embodiment. To be specific, a positive terminal and a negative terminal of a relay connector 283m of the upper left LED board 281m are electrically connected to a positive terminal and a negative terminal of a relay connector 283o of the left upper LED board 281o by the bridging wires 33mo, respectively. Thus, the LED light sources 28 mounted on the upper left LED board 281m and the left upper LED board 281o are made connected in series to each other over the two boards via the bridging wires 33mo. A power supply connector 282o disposed at the lower end portion of the left upper LED board 281o (in the middle of the left side face of the chassis plate 22) functions as a positive and negative connector for the LED light sources 28 that are connected in series to each other over the two boards.

In the upper right LED board 281n and the right upper LED board 281q that adjoins the upper right LED board 281n sandwiching the upper right corner of the chassis plate 22, the LED light sources 28 of the upper right LED board 281n are electrically connected to the LED light sources 28 of the right upper LED board 281q by bridging wires 33nq that define a portion of the power supply wires. This connecting structure is also same as the connecting structure between the upper left LED board 281a and the left LED board 281c of the first embodiment. To be specific, a positive terminal and a negative terminal of a relay connector 283n of the upper right LED board 281n are electrically connected to a positive terminal and a negative terminal of a relay connector 283q of the right upper LED board 281q by the bridging wires 33nq, respectively. Thus, the LED light sources 28 mounted on the upper right LED board 281n and the right upper LED board 281q are made connected in series to each other over the two boards via the bridging wires 33nq. A power supply connector 282q disposed at the lower end portion of the right upper LED board 281q (in the middle of the right side face of the chassis plate 22) functions as a positive and negative connector for the LED light sources 28 that are connected in series to each other over the two boards.

In the lower left LED board 281s and the left lower LED board 281p that adjoins the lower left LED board 281s sandwiching the lower left corner of the chassis plate 22, the LED light sources 28 of the lower left LED board 281s are electrically connected to the LED light sources 28 of the left lower LED board 281p by bridging wires 33sp that define a portion of the power supply wires. This connecting structure is also same as the connecting structure between the upper left LED board 281a and the left LED board 281c of the first embodiment. To be specific, a positive terminal and a negative terminal of a relay connector 283s of the lower left LED board 281s are electrically connected to a positive terminal and a negative terminal of a relay connector 283p of the left lower LED board 281p by the bridging wires 33sp, respectively. Thus, the LED light sources 28 mounted on the lower left LED board 281s and the left lower LED board 281p are made connected in series to each other over the two boards via the bridging wires 33sp. A power supply connector 282p disposed at the upper end portion of the left lower LED board 281p (in the middle of the left side face of the chassis plate 22) functions as a positive and negative connector for the LED light sources 28 that are connected in series to each other over the two boards.

In the lower right LED board 281t and the right lower LED board 281r that adjoins the lower right LED board 281t sandwiching the lower right corner of the chassis plate 22, the LED light sources 28 of the lower right LED board 281t are electrically connected to the LED light sources 28 of the right lower LED board 281r by bridging wires 33tr that define a portion of the power supply wires. This connecting structure is also same as the connecting structure between the upper left LED board 281a and the left LED board 281c of the first embodiment. To be specific, a positive terminal and a negative terminal of a relay connector 283t of the lower right LED board 281t are electrically connected to a positive terminal and a negative terminal of a relay connector 283r of the right lower LED board 281r by the bridging wires 33tr, respectively. Thus, the LED light sources 28 mounted on the lower right LED board 281t and the right lower LED board 281r are made connected in series to each other over the two boards via the bridging wires 33tr. A power supply connector 282r disposed at the upper end portion of the right lower LED board 281r (in the middle of the right side face of the chassis plate 22) functions as a positive and negative connector for the LED light sources 28 that are connected in series to each other over the two boards.

One ends of power supply wires 32mo that define a portion of the power supply wires are electrically connected to the power supply board 30 arranged to supply electric power to the LED light sources 28. The power supply wires 32mo are connected to the power supply board 30 at a substantial center of the chassis plate 22 as shown in FIG. 6. The other ends of the power supply wires 32mo are electrically connected to the LED light sources 28 mounted on the upper left LED board 281m and the left upper LED board 281o via the power supply connector 282o.

Likewise, the LED light sources 28 mounted on the upper right LED board 281n and the right upper LED board 281q are electrically connected to the power supply board 30 via power supply wires 32nq. The LED light sources 28 mounted on the lower left LED board 281s and the left lower LED board 281p are electrically connected to the power supply board 30 via power supply wires 32sp. The LED light sources 28 mounted on the lower right LED board 281t and the right lower LED board 281r are electrically connected to the power supply board 30 via power supply wires 32tr.

Thus, in the present embodiment, the light LED boards 281 disposed so as to have the shape of the letter "L" are electrically connected to the power supply wires 32mo, 32nq, 32sp and 32tr in the middle of the right side face and in the middle of the left side face of the chassis plate 22. Then, the light LED boards 281 adjoining each other sandwiching the corners of the chassis plate 22 are connected to each other by the bridging wires 33mo, 33nq, 33sp and 33tr.

Similarly to the first embodiment and the second embodiment, with the configuration of the present embodiment that the boards that are apart from each other (on the corner sides) are connected to each other so as to be bridged by the bridging wires 33mo, 33nq, 33sp and 33tr while the LED light sources 28 (the LED boards 281) are disposed so as to have the shape of the letter "L", the length of the power supply electric wires can be reduced. Thus, an adverse effect of noise (unnecessary radiation) caused by or exercised on the power supply wires (the cost of noise prevention) can be decreased. In addition, the reduced length of the power supply wires can decrease the amount of electric wires used in one liquid crystal display device.

In addition, in the present embodiment, the lengths of the four bridging wires 33mo, 33nq, 33sp and 33tr can be made equal to one another. In addition, the four power supply wires 32mo, 32nq, 32sp and 32tr are all connected to the power supply board 30 at the substantial center of the chassis plate 22 while connected to the LED boards 281 in the middle of the right side face or in the middle of the left side face of the chassis plate 22, so that the lengths of the four power supply wires 32mo, 32nq, 32sp and 32tr can be made equal to one another. Thus, the kinds of the components can be reduced.

Further, in the present embodiment, the number of block 1) consisting of the LED light sources 28 mounted on the upper left LED board 281m and the left upper LED board 281o, the number of block 2) consisting of the LED light sources 28 mounted on the upper right LED board 281n and the right upper LED board 281q, the number of block 3) consisting of the LED light sources 28 mounted on the lower left LED board 281s and the left lower LED board 281p, and the number of block 4) consisting of the LED light sources 28 mounted on the lower right LED board 281t and the right lower LED board 281r are equal to one another. Thus, variations in electric load among blocks 1) to 4) respectively connected to the power supply wires 32mo, 32nq, 32sp and 32tr can be reduced, which can simplify the configuration of the LED control unit (which allows easy control of the LED light sources 28).

Figure 7:
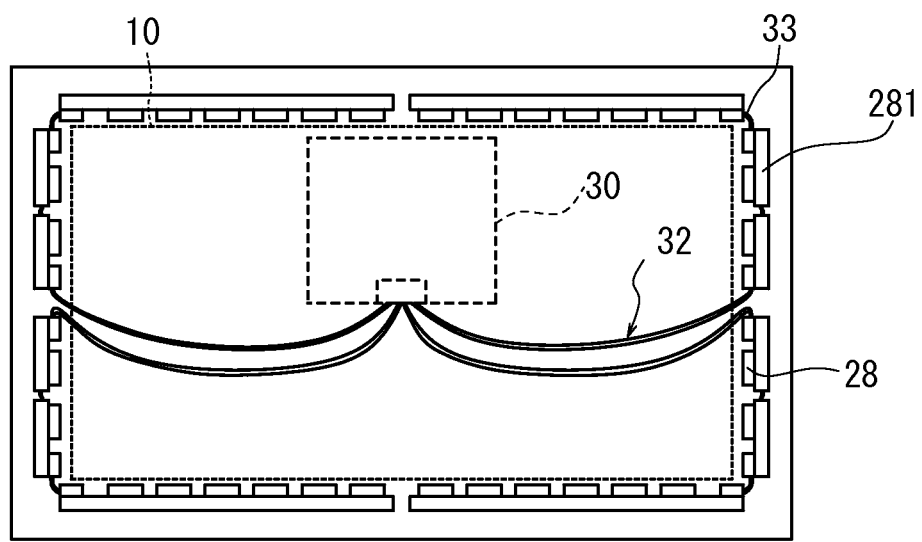
FIG. 7 is a modified embodiment of the liquid crystal display device of the third preferred embodiment shown in FIG. 6.

The present invention is not limited to the third embodiment that each of the LED boards 281 is divided into two pieces in a middle portion of each side face of the chassis plate 22 (i.e., eight LED boards 281 are included in total). For example, it is preferable that as shown in FIG. 7, each of LED boards 281 that are disposed on the right and left side faces of a chassis plate 22 is divided into four pieces, and the LED boards 281 that are closest to the corners of the chassis plate 22 are connected by bridging wires 33 to LED boards 281 that adjoin those LED boards 281 and are disposed on the upper and lower side faces of the chassis plate 22. As long as the LED boards 281 adjoining each other sandwiching the corners of the chassis plate 22 are connected as described above, the LED boards 281 can be divided in any manner.

Figure 8:
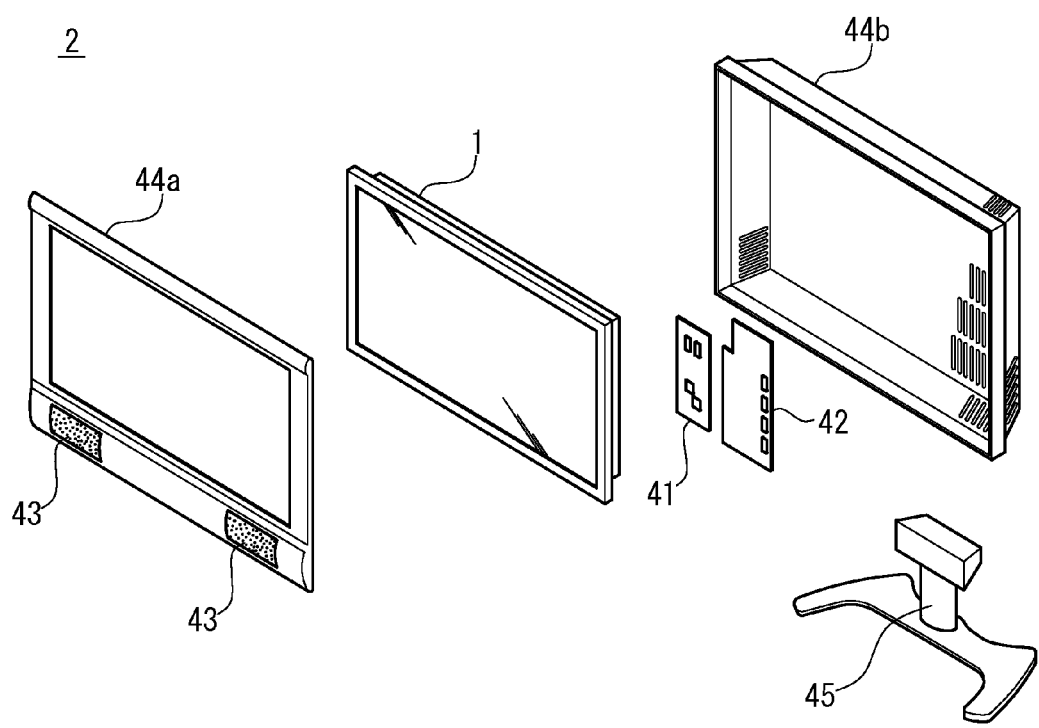
FIG. 8 is an exploded perspective view showing a television receiving device of a preferred embodiment of the present invention.
Figure 9:
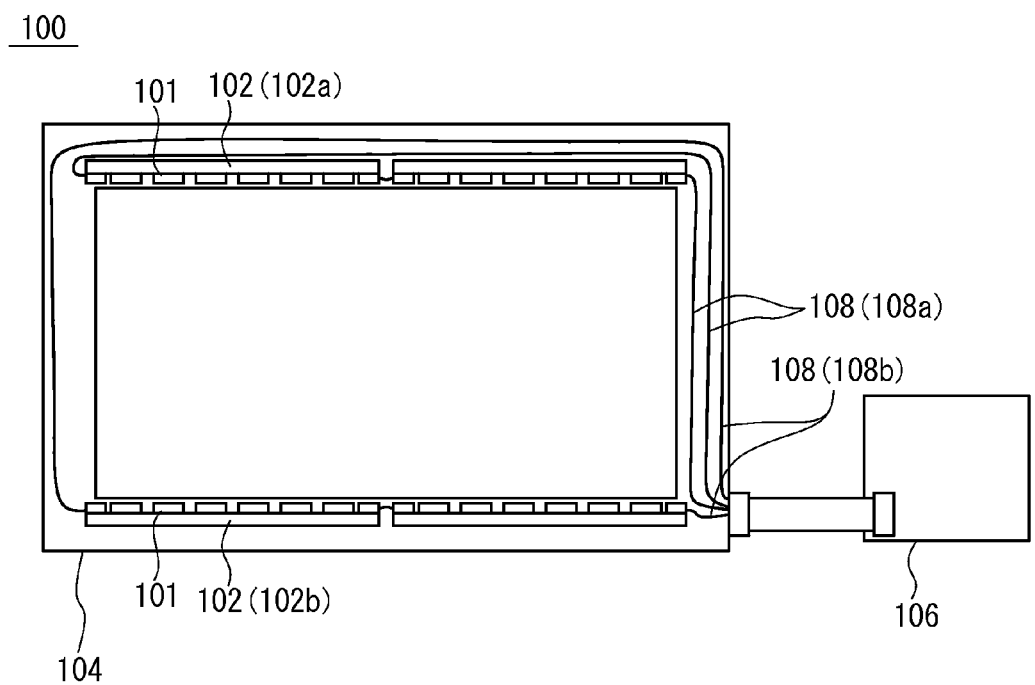
FIG. 9 is a view showing a configuration of a wiring route in a conventional liquid crystal display device.

Next, a description of a television receiving device of a preferred embodiment of the present invention will be provided. FIG. 8 is an exploded perspective view showing a schematic configuration of a television receiving device 2 of the present embodiment.

The television receiving device 2 includes the liquid crystal display device 1 of the present embodiments, a tuner 41, an electric power supply 42, loudspeaker units 43, a cabinet 44a, a cabinet 44b, and a supporting member 45 as shown in FIG. 8. A conventional tuner, loudspeaker units, electric power supply, cabinets and supporting member can be used as the tuner 41, the loudspeaker units 43, the electric power supply 42, the cabinet 44a, the cabinet 44b and the supporting member 45, so that brief descriptions thereof are provided instead of detailed descriptions.

The tuner 41 is arranged to produce an image signal and a sound signal of a given channel based on a received radio wave. A conventional terrestrial tuner (analog and/or digital), a BS tuner and a CS tuner are preferably used as the tuner 41. The loudspeaker units 43 are arranged to produce a sound based on the sound signal produced by the tuner 41. Generally-used speakers are preferably used as the loudspeaker units 43. The electric power supply 42 is arranged to supply electric power to the display device 1 of the present embodiments, the tuner 41, the loudspeaker units 43 and other components.

The liquid crystal display device 1 of the present embodiments, the tuner 41, the loudspeaker units 43 and the electric power supply 42 are housed in the cabinet 44a and the cabinet 44b, which is supported by the supporting member 45. Shown in FIG. 8 is the configuration that the cabinets define a front side cabinet 44a and a back side cabinet 44b, between which the display device 1, the tuner 41, the loudspeaker units 43 and the electric power supply 42 are housed. Another configuration such that the tuner 41, the loudspeaker units 43 and the electric power supply 42 are incorporated in the liquid crystal display device 1 is preferably used.

The foregoing description of the preferred embodiments of the present invention has been presented for purposes of illustration and description with reference to the drawings. However, it is not intended to limit the present invention to the embodiments, and modifications and variations are possible as long as they do not deviate from the principles of the present invention.

For example, the LED light sources 28 and the wires of various kinds that are explained in the above-described embodiments may be opposite in polarity.

In addition, though explained in the above-described embodiments is using the LED light sources 28 as the light sources, the technical idea of the present invention can be applied also to an edge light type illuminating device including fluorescent tubes as light sources.

In addition, though explained in the above-described embodiments are the wiring routes of various kinds, wiring routes are not limited to these wiring routes. The wiring patters can be changed as appropriate only if the light sources disposed perpendicular to each other are connected by the bridging wires that define a portion of the power supply wires.

In addition, though explained in the above-described embodiments is the configuration that the LED light sources 28 mounted on the same LED board 281 are at least connected in series to each other, the present invention is not limited to this configuration, and the LED light sources 28 can be connected in any manner. For example, it is preferable that a plurality of LED light sources 28 mounted on a same LED board 281 are divided into blocks, where a given number of LED light sources 28 are connected in series to each other in each block, and the blocks are controlled independently from each other (the blocks are connected in parallel).

The invention claimed is:

1. A liquid crystal display device comprising:
    a liquid crystal display panel; and
    an illuminating device disposed on a back side face of the liquid crystal display panel, and arranged to project light onto the liquid crystal display panel, the illuminating device comprising:
        a chassis plate having a square shape when seen in a plan view;
        edge light type light sources that are disposed along at least one side face of the chassis plate and another side face of the chassis plate that is perpendicular to the one side face;
        power supply means arranged to supply electric power to the light sources; and
        a power supply wire arranged to electrically connect the light sources and the power supply means, wherein
    at least a portion of the power supply wire comprises a bridging wire arranged to connect the light source disposed along the one side face of the chassis plate and the light source disposed along the another side face of the chassis plate that is perpendicular to the one side face;
    the light sources comprise light sources that are each disposed along four side faces of the chassis plate;
    one end of each power supply wire, which comprises a portion of each power supply wire, is connected to the power supply means at a substantial center of the chassis plate;
    the light sources comprise a plurality of LED light sources mounted on each of LED boards that are disposed along the side faces of the chassis plate;
    each of the LED boards are divided into a plurality of LED boards on each of the side faces of the chassis plate;
    the LED boards that are disposed along two opposing side faces of the chassis plate are connected to the power supply means by the power supply wires, and among the LED boards disposed along the two opposing side faces, the LED boards that are closest to the corners of the chassis plate are connected by the bridging wires to some of the LED boards that are disposed along the other two opposing side faces of the chassis plate, the some of the LED boards adjoining the LED boards closest to the corners while sandwiching the corners;
    the light sources comprise the plurality of LED light sources mounted on each of the LED boards that are disposed along the side faces of the chassis plate;
    the LED boards are divided into eight LED boards in middle portions of the side faces of the chassis plate; and
    the four LED boards that are disposed along two opposing side faces of the chassis plate are connected to the power supply means by the power supply wires in the middle portions of the side faces of the chassis plate, and connected by the bridging wires to the other four LED boards that are disposed along the other two opposing side faces of the chassis plate and adjoin the four LED boards connected to the power supply means sandwiching the corners of the chassis plate.

2. A television receiving device that comprises the liquid crystal display device according to claim 1.

3. An illuminating device arranged to project light onto a liquid crystal display panel, the illuminating device comprising:
    a chassis plate having a square shape when seen in a plan view;
    edge light type light sources that are disposed along at least one side face of the chassis plate and another side face of the chassis plate that is perpendicular to the one side face;
    power supply means arranged to supply electric power to the light sources; and
    a power supply wire arranged to electrically connect the light sources and the power supply means, wherein
    at least a portion of the power supply wire comprises a bridging wire arranged to connect the light source disposed along the one side face of the chassis plate and the light source disposed along the another side face of the chassis plate that is perpendicular to the one side face;
    the light sources comprise light sources that are each disposed along four side faces of the chassis plate;
    one end of each power supply wire, which comprises a portion of each power supply wire, is connected to the power supply means at a substantial center of the chassis plate;
    the light sources comprise a plurality of LED light sources mounted on each of LED boards that are disposed along the side faces of the chassis plate;
    each of the LED boards are divided into a plurality of LED boards on each of the side faces of the chassis plate;
    the LED boards that are disposed along two opposing side faces of the chassis plate are connected to the power supply means by the power supply wires, and among the LED boards disposed along the two opposing side faces, the LED boards that are closest to the corners of the chassis plate are connected by the bridging wires to some of the LED boards that are disposed along the other two opposing side faces of the chassis plate, the some of the LED boards adjoining the LED boards closest to the corners while sandwiching the corners;

the light sources comprise the plurality of LED light sources mounted on each of the LED boards that are disposed along the side faces of the chassis plate;

the LED boards are divided into eight LED boards in middle portions of the side faces of the chassis plate; and the four LED boards that are disposed along two opposing side faces of the chassis plate are connected to the power supply means by the power supply wires in the middle portions of the side faces of the chassis plate, and connected by the bridging wires to the other four LED boards that are disposed along the other two opposing side faces of the chassis plate and adjoin the four LED boards connected to the power supply means sandwiching the corners of the chassis plate.

4. The illuminating device according to claim 3, wherein each of the LED light sources comprises a blue light-emitting chip that is coated with a fluorescent material that has an emission peak wavelength in a yellow region, and the LED light sources are arranged to emit white light.

5. The illuminating device according to claim 3, wherein each of the LED light sources comprises a blue light-emitting chip that is coated with a fluorescent material that has an emission peak wavelength in a green region and a red region, and the LED light sources are arranged to emit white light.

6. The illuminating device according to claim 3, wherein each of the LED light sources comprises:
 a blue light-emitting chip that is coated with a fluorescent material that has an emission peak wavelength in a green region; and
 a red light-emitting chip, and the LED light sources are arranged to emit white light.

7. The illuminating device according to claim 3, wherein each of the LED light sources comprises a blue light-emitting chip, a green light-emitting chip, and a red light-emitting chip, and the LED light sources are arranged to emit white light.

8. The illuminating device according to claim 3, wherein each of the LED light sources comprises an ultraviolet light chip and a fluorescent material, and the LED light sources are arranged to emit white light.

9. The illuminating device according to claim 3, wherein each of the LED light sources comprises an ultraviolet light chip that is coated with a fluorescent material that has an emission peak wavelength in a blue region, a green region, and a red region, and the LED light sources are arranged to emit white light.

10. A television receiving device that comprises the illuminating device according to claim 3.

* * * * *